Figure 1:
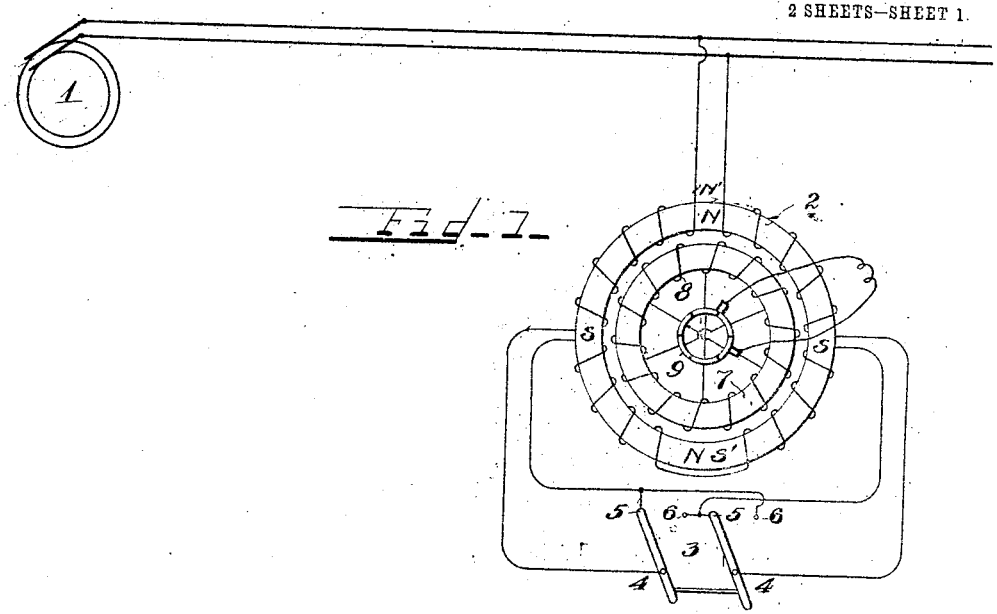

No. 818,027. PATENTED APR. 17, 1906.
D. C. JACKSON.
INDUCTION MOTOR.
APPLICATION FILED MAR. 8, 1900. RENEWED APR. 11, 1904.

2 SHEETS—SHEET 1.

Witnesses
Max W. Zabel.
C. J. Schmidt.

Inventor
Dugald C. Jackson
By Charles A. Brown & Cragg
Attorneys

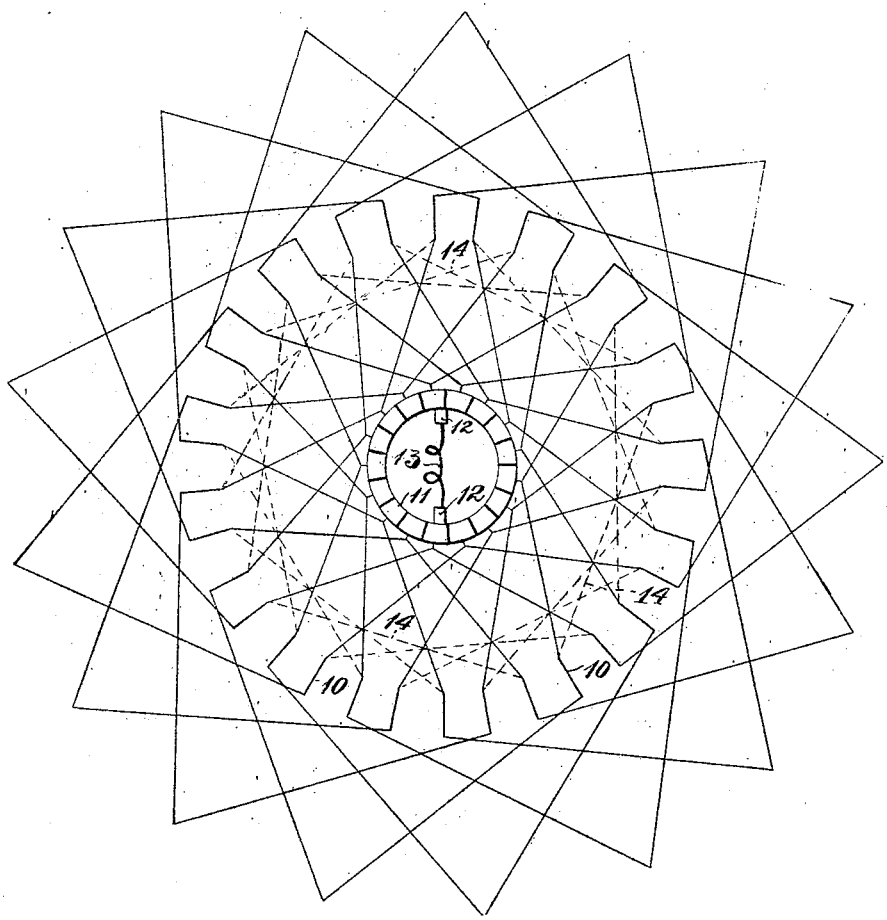

UNITED STATES PATENT OFFICE.

DUGALD C. JACKSON, OF CHICAGO, ILLINOIS.

INDUCTION-MOTOR.

No. 818,027.　　　　Specification of Letters Patent.　　　Patented April 17, 1906.

Application filed March 8, 1900. Renewed April 11, 1904. Serial No. 202,670.

*To all whom it may concern:*

Be it known that I, DUGALD C. JACKSON, a citizen of the United States, residing at Chicago, in the county of Cook and State of Illinois, have invented a certain new and useful Improvement in Induction-Motors, of which the following is a full, clear, concise, and exact description, reference being had to the accompanying drawings, forming a part of this specification.

My invention relates to induction-motors, and more particularly to the starting arrangements therefor, and has for its object the provision of an improved method for operating machines of this class.

As is well known, starting arrangements are generally provided for single-phase induction-motors, the said starting arrangements consisting in some cases of splitting the phase of the alternating current and introducing it into the field-winding of the motor, so that the same may start as a polyphase induction-motor, and in other cases of arranging the motor to start as a repulsion-motor, using a commutator such as is described in Patent No. 389,352. Arrangements are usually provided by means of which the starting devices may be removed after the motor is in operation. This introduces complications and difficulties into the operation of such machines and reduces the efficiency thereof. Various other arrangements have also been employed for effecting the same object well known to those skilled in the art.

It is the prime object of my present invention to provide upon the armature a winding which operates as an ordinary closed-coil direct-current winding in some of its modifications, with a given number of poles in the field. The winding is an ordinary winding of either drum or ring fashion and connected at intervals to a commutator, the brushes being preferably short-circuited or electrically connected through a variable resistance. Such a winding when placed in a field with the correct number of poles will operate under the influence of the alternating field, as is well understood in the art. In addition to the ordinary interconnections between the coils which are necessary in order that the armature operate as a direct-current armature I place thereon short-circuiting strips suitably interconnecting various coils which will not introduce any difficulties when the armature is operating under the normal number of field-poles. I provide additional means, in connection with the armature-field, whereby I am enabled to change the number of poles to whose influence the armature is subjected, the change in the number of poles serving to alter the character of the magnetic flux threading the armature, this change serving to bring the short-circuiting strips into service, interconnecting points of unlike potential, the armature thereby operating practically as if constructed of short-circuited coils and following the laws of operation of ordinary induction-armatures. After the motor has been brought up to speed by the use of its commutator, as just described, the connections of the field-winding may be changed so as to change the number of pairs of poles and the armature will continue to run as a short-circuited induction-motor armature. In this arrangement I am enabled to do away with all extraneous adjustment for splitting the phase of the alternating current, with its concomitant inconveniences and disadvantages, or changing of the connections of the armature-coils, whereby irregularities and difficulties are introduced into the operation thereof, a simple means only being required for changing the number of poles acting upon the armature.

In the preferred embodiment of my invention I may employ the ordinary multiple-path direct-current armature-winding with cross-connected commutator. If this machine is constructed to operate with eight magnetic poles in the field, with the brushes electrically connected, the armature will operate on the repulsion principle described in Patent No. 389,352, as is well understood. After the armature is running, if the connections of the field be then changed so as to give four magnetic poles, the armature will continue to run as a closed-circuit armature in a single-phase induction-motor.

In place of the multiple-path winding with cross-connected commutator I may employ a series-path or progressive armature-winding with short-circuiting strips disposed about the armature, said short-circuiting strips being adapted to convey current between conductors when the number of poles is changed for the running condition of the armature, in which case the armature may start on the repulsion principle with a lesser number of poles and be operated at a greater number. In any of these arrangements the usual distributed form of energizing-coils may be employed.

I will explain my invention more particularly with reference to the accompanying drawings, in which—

Figure 2:
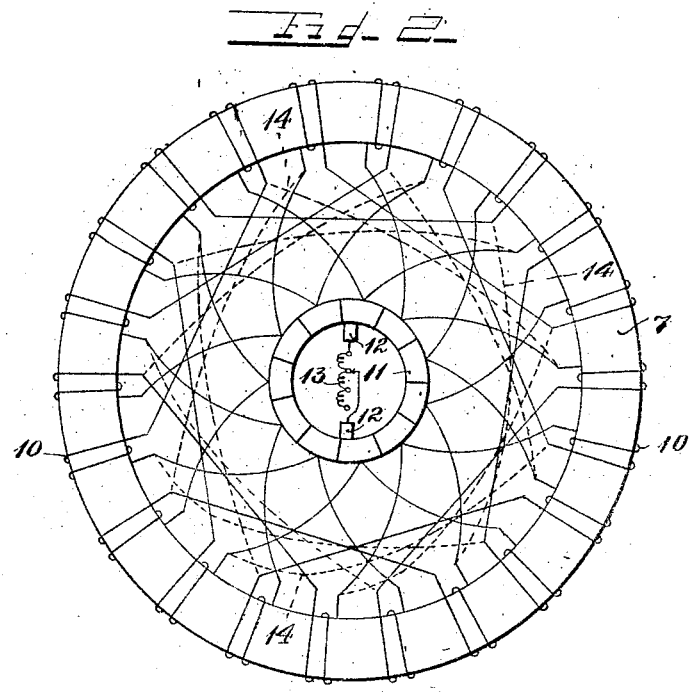

Figure 1 is a diagrammatic view of an armature constructed in accordance with my invention, a multiple-path direct-current winding with cross-connected commutator being shown thereon, together with means for changing the number of magnetic poles to which the armature is subjected. Fig. 2 is a view of another embodiment of my invention as adapted to a progressive ring-winding. Fig. 3 is a similar view, but applied to a drum-winding.

Like characters of reference indicate like parts throughout the views.

In Fig. 1 I have shown a source of current 1 supplying current to the distributed winding of the field-ring 2. A switch 3 is employed for changing the interconnections of the field-coils, whereby the current may be reversed in two of the coils, the switch being an ordinary double-throw switch connecting the terminals 4 4 with the terminals 5 5 or 6 6, respectively. By the aid of this switch the number of magnetic poles in the field-circuit may be changed from four to two, and vice versa. I have shown also my improved armature 7 provided with an ordinary multiple-path ring-winding 8, suitably connected to a commutator 9, opposite segments of the said commutator being cross-connected by short-circuiting strips, the brushes being placed preferably ninety degrees apart and electrically connected, preferably through a resistance. When the machine is connected up with four magnetic poles N N S S in the field, it will start as an ordinary four-pole repulsion-motor. If now the number of poles be changed to two, N' S', by the aid of the switching means 3, the short-circuiting strips across the commutator will serve to short-circuit coils of opposite polarity upon the armature-circumference, thereby causing the armature to operate as an ordinary short-circuited induction-motor winding. As will be seen, no operation other than changing the switch-handle of the switching means 3 is necessary to change the motor from its starting condition to its running condition, so that no change in the armature-circuits or commutator connections need be made, thereby providing a means for advantageously and easily starting single-phase motors.

In Fig. 2 I have shown a Gramme ring provided with a progressive winding adapted to operate in accordance with my invention. The ring is provided with coils 10 10, which are connected in the ordinary fashion, as is well understood in the art, the interconnections being of such a character that the machine is adapted to operate as an alternating-current machine with a direct-current winding, two magnetic poles being in the field. The coils are connected at intervals to a commutator 11, brushes 12 12 engaging the said commutator, the said brushes being electrically connected, preferably through a variable resistance or reactance 13. If an alternating current is now impressed upon the field-winding, so that two poles will be created in the field, the armature will start and operate according to well-known laws. After the armature has attained its normal speed the interconnections of the field-windings are changed by the aid of the means hereinbefore described, so that four magnetic poles will be created in the field instead of two. In order to adapt the armature to operate as a closed-coil induction-motor armature winding with four magnetic poles in the field, I provide thereon the cross-connecting conductors or short-circuiting strips 14, which electrically connect points of different electrical polarity upon the armature-coils. These short-circuiting conductors which connect points of practically like electrical potential when the armature is operating in a two-pole field serve to convey current across the armature between coils of unlike potential when the armature is operating in a four-pole field, thereby allowing the motor to start as an ordinary alternating-current repulsion-motor with two magnetic poles in the field and coöperating in the operation of the same as an ordinary induction-motor when there are four magnetic poles in the field.

Referring now to Fig. 3, I have shown a drum-armature as provided with my improved winding, consisting, preferably, of coils 10 10, suitably interconnected as in the ordinary progressive winding and at intervals connected to the commutator 11, brushes 12 12, preferably electrically connected through a variable resistance or reactance, being again shown. The connections upon the rear of the armature are indicated by the outside triangular lines, as is well understood. The operation of this armature is the same as the operation of the ring-armature, the machine being adapted to start as a two-pole machine and operate as a four-pole machine, the short-circuiting conductors 14 again permitting the machine to start as a repulsion-motor with two poles in the field and coöperating to normally operate the same as an induction-motor when the number of field-poles has been changed to four. The special connections shown are generally equivalent to connecting adjacent commutator-segments together through satisfactory resistances unless the relative resistance of the special connections and the regular commutator connections are given a different effect by making the commutator connections of higher resistance.

I have herein shown my invention as applied particularly to closed-coil direct-current armature-windings; but its application to other windings will be readily understood by those skilled in the art. I believe it to be broadly new with me to use progressive armature-windings adapted to operate in a field of a varying number of poles.

I have used the words "passing currents through the said armature-windings in progression" in the claims to signify the manner of flow of the current in a direct-current progressive armature-winding, as well understood by those skilled in the art.

While I have herein shown and particularly described one embodiment of my invention, I do not wish to limit myself to the precise construction and arrangement as herein specifically set forth; but,

Having thus described my invention, I claim as new and desire to secure by Letters Patent the following:

1. The herein-described method of operating an induction-motor, provided with an armature having a progressive winding, a commutator, and auxiliary conductors for short-circuiting conductors of the armature-winding, which consists in establishing a field by a single-phase alternating current, subjecting the progressive armature-winding to the influence of the said single-phase alternating field, inducing currents in the said armature-winding and passing the same in progression through the coils of the armature-winding, the commutator and brushes, whereby the motor is started, changing the number of poles of the field to which the armature is subjected, and conveying current between the coils of the armature that are subject to unlike poles of the field through the said auxiliary conductors for normally operating said motor.

2. The herein-described method of operating an induction-motor provided with an armature having a progressive winding and having interconnections thereon for short-circuiting coils thereof and a commutator, which consists in subjecting the same to a field having a plurality of magnetic poles, inducing currents in the said armature-winding and passing the same through the said armature-winding in progression, whereby the said motor is started, then subjecting the same to a field with a different number of magnetic poles, inducing currents in the said progressive armature-winding and conveying the same through the said short-circuiting conductors for normally operating said motors.

3. The herein-described method of operating an induction-motor provided with an armature having a progressive winding, a commutator and auxiliary conductors for electrically connecting different portions of the armature-windings, which consists in subjecting the armature to an alternating field, inducing current in the progressive armature-winding and passing the same in progression through the coils of the armature by way of the commutator and brushes, changing the number of poles of the field to which the armature is subjected, inducing currents in the said armature, and conveying the same between the coils of the said armature that are subject to unlike poles of the field through the said auxiliary conductors.

4. The herein-described method of operating an induction-motor provided with an armature having a progressive winding having interconnections thereon for short-circuiting coils thereof and a commutator, which consists in establishing a field by a single-phase alternating current, subjecting the armature to the influence of said field so that portions of the armature electrically connected by means of the auxiliary conductors are normally under the influence of poles of like sign, conveying current through the said armature-conductors by way of the commutator and brushes for starting said motor, changing the number of poles of the field to which the armature is subjected, and conveying current between the coils of the armature that are subject to unlike poles of the field through the said auxiliary conductors for normally operating said motor.

5. The herein-described method of operating an induction-motor provided with an armature having a winding and auxiliary conductors for electrically connecting portions of the armature-windings, which consists in establishing a field by a single-phase alternating current, subjecting the armature thereto, and creating in the said armature at portions thereof which are electrically connected by means of the auxiliary conductors magnetic fields of substantially like magnetic potential, inducing current in the armature-winding and passing the same through the coils thereof by way of the commutator and brushes for starting the motor, changing the number of poles of the field to which the armature is subjected, and conveying current between coils of the armature that are subject to unlike poles of the field through the said auxiliary conductors.

6. The herein-described method of operating an alternating-current dynamo-electric machine provided with an armature having a reëntrant progressive winding and a commutator associated with said winding, which consists in establishing a field by a single-phase alternating current to start the motor, changing the number of poles of the field after the motor is started, and completing the circuit through each spire of said progressive winding through an additional conductor of resistance-wire.

7. The herein-described method of operating an alternating-current dynamo-electric machine provided with an armature having a reëntrant progressive winding and a commutator associated with said winding, which consists in establishing a single-phase alternating-current field having a certain number of poles for starting the motor, changing the number of poles of the field after the motor is started, and providing additional conductors of resistance-wire for forming conducting-paths between successive commutator-segments of said commutator.

In witness whereof I hereunto subscribe my name this 24th day of February, A. D. 1900.

DUGALD C. JACKSON.

Witnesses:
 FLORENCE WICKLIN,
 MAX W. ZABEL.